(12) United States Patent
Lewis et al.

(10) Patent No.: US 12,030,568 B2
(45) Date of Patent: Jul. 9, 2024

(54) HYDRAULIC TENSIONING SYSTEM FOR TRACK DRIVE VEHICLE

(71) Applicant: Barreto Manufacturing, Inc., La Grande, OR (US)

(72) Inventors: Mark Z. Lewis, Cove, OR (US); Lucas T. Barreto, Boise, ID (US); Gregory L. Barreto, Cove, OR (US)

(73) Assignee: Barreto Manufacturing, Inc., La Grande, OR (US)

( * ) Notice: Subject to any disclaimer, the term of this patent is extended or adjusted under 35 U.S.C. 154(b) by 701 days.

(21) Appl. No.: 17/151,061

(22) Filed: Jan. 15, 2021

(65) Prior Publication Data

US 2021/0221454 A1    Jul. 22, 2021

Related U.S. Application Data

(60) Provisional application No. 62/962,825, filed on Jan. 17, 2020.

(51) Int. Cl.
| | |
|---|---|
| *B62D 55/30* | (2006.01) |
| *B62D 55/14* | (2006.01) |
| *B62D 55/06* | (2006.01) |
| *B62D 55/24* | (2006.01) |
| *E02F 3/34* | (2006.01) |

(52) U.S. Cl.
CPC .......... *B62D 55/305* (2013.01); *B62D 55/14* (2013.01); *B62D 55/06* (2013.01); *B62D 55/244* (2013.01); *E02F 3/3414* (2013.01)

(58) Field of Classification Search
CPC .............................. B62D 55/305; B62D 55/30
See application file for complete search history.

(56) References Cited

U.S. PATENT DOCUMENTS

| | | | | |
|---|---|---|---|---|
| 2,017,729 A | * | 10/1935 | Panzegrau ........... | B62D 55/305 |
| | | | | 474/135 |
| 2,453,750 A | * | 11/1948 | Kamlookhine ...... | B62D 55/305 |
| | | | | 305/141 |
| 2,561,901 A | * | 7/1951 | Bachman ............. | B62D 55/305 |
| | | | | 267/221 |
| 3,332,725 A | * | 7/1967 | Reinsma .............. | B62D 55/305 |
| | | | | 305/153 |
| 3,899,218 A | * | 8/1975 | Blomstrom .......... | B62D 55/305 |
| | | | | 305/60 |

(Continued)

FOREIGN PATENT DOCUMENTS

| | | |
|---|---|---|
| JP | S 58-53577 | 3/1983 |
| WO | WO 2019/185195 | 10/2019 |

*Primary Examiner* — Jason R Bellinger
(74) *Attorney, Agent, or Firm* — Klarquist Sparkman, LLP

(57) ABSTRACT

A carriage assembly for a continuous track drive system can include a plurality of road wheels, a pivotable idler wheel, a drive wheel, a continuous track extending around the plurality of road wheels, the pivotable idler wheel, and the drive wheel, and a tensioning system coupled to the idler wheel. The tensioning system can include an actuator and a biasing member. The tensioning system can be configured such that when the continuous track is driven in a first direction the actuator is inactive and the biasing member maintains tension in the continuous track, and when the continuous track is driven in a second direction the actuator is active and applies force to the pivotable idler wheel to maintain tension in the continuous track.

19 Claims, 10 Drawing Sheets

(56) References Cited

U.S. PATENT DOCUMENTS

| | | | | |
|---|---|---|---|---|
| 4,149,757 | A | | 4/1979 | Meisel, Jr. |
| 4,650,260 | A | * | 3/1987 | Satzler ................. B62D 55/305 |
| | | | | 305/155 |
| 4,781,257 | A | * | 11/1988 | Gee ...................... B62D 55/305 |
| | | | | 180/9.5 |
| 4,953,919 | A | * | 9/1990 | Langford ............. B62D 55/065 |
| | | | | 305/144 |
| 5,334,106 | A | * | 8/1994 | Purcell ................. B62D 55/305 |
| | | | | 305/145 |
| 5,794,731 | A | * | 8/1998 | Klaus ................... B62D 55/305 |
| | | | | 180/9.56 |
| 5,851,058 | A | * | 12/1998 | Humbek ................ B62D 55/30 |
| | | | | 305/152 |
| 6,001,036 | A | * | 12/1999 | O'Brien ................ B62D 55/30 |
| | | | | 305/146 |
| 6,224,172 | B1 | | 5/2001 | Goodwin |
| 6,322,171 | B1 | * | 11/2001 | Fornes .................. B62D 55/30 |
| | | | | 305/151 |
| 6,431,008 | B1 | | 8/2002 | Oertley et al. |
| 7,914,087 | B2 | | 3/2011 | Alfthan |
| 8,042,628 | B2 | | 10/2011 | Bordini |
| 8,079,650 | B2 | * | 12/2011 | Tokach ................ B62D 55/305 |
| | | | | 305/146 |
| 8,371,402 | B2 | | 2/2013 | Allaire |
| 9,016,810 | B2 | | 4/2015 | Busley et al. |
| 9,789,918 | B2 | | 10/2017 | De Palma |
| 2020/0114992 | A1 | * | 4/2020 | Edelin ................. B62D 55/305 |
| 2021/0129927 | A1 | * | 5/2021 | Lussier ................ B62D 55/244 |

* cited by examiner

HYDRAULIC TENSIONING SYSTEM FOR TRACK DRIVE VEHICLE

CROSS REFERENCE TO RELATED APPLICATION

This application claims the benefit of U.S. Provisional Application No. 62/962,825, filed Jan. 17, 2020, which is incorporated herein by reference in its entirety.

FIELD

The present disclosure pertains to track carriages and tensioning systems for track drive vehicles.

BACKGROUND

A number of utility vehicles employ a pair of continuous tracks for propulsion. Such utility vehicles can include carriages with a drive wheel or sprocket that propels the continuous track, as well as longitudinally spaced fore and aft idlers such as idler wheels, with a plurality of rollers or roller wheels distributed between the idlers for load bearing support and terrain adaptability. In a typical arrangement, a pivotable idler wheel tensions the track during forward motion. However, when traveling in reverse, the force applied to the idler wheel may cause it to pivot rearwardly, resulting in undesirable slack in the continuous track. Accordingly, there exists a need for improvements to carriages for track drive vehicles.

SUMMARY

Certain embodiments of the disclosure pertain to carriage assemblies for track drive vehicles including tensioning assemblies with an actuator that is automatically activated to apply force to the track when the vehicle is driven in the reverse direction and deactivated when the vehicle is driven in the forward direction. In a representative embodiment, a carriage assembly includes a plurality of road wheels, a pivotable idler wheel, a drive wheel, a continuous track extending around the plurality of road wheels, the pivotable idler wheel, and the drive wheel, and a tensioning system coupled to the idler wheel. The tensioning system includes an actuator and a biasing member. The tensioning system is configured such that when the continuous track is driven in a first direction the actuator is inactive and the biasing member maintains tension in the continuous track, and when the continuous track is driven in a second direction the actuator is active and applies force to the pivotable idler wheel to maintain tension in the continuous track.

In some embodiments, the biasing member is coupled to the actuator. In some embodiments, the actuator is coupled to the idler wheel. In further embodiments, the actuator and the biasing member are coaxially aligned. In some embodiments, the biasing member is positioned over the actuator such that the biasing member and the actuator are concentrically aligned.

In additional embodiments, the carriage assembly further includes a fixed idler wheel, wherein the pivotable idler wheel is pivotably coupled to an axle of the fixed idler wheel. In some embodiments, the biasing member is configured to limit movement of the idler wheel as it pivots toward the drive wheel when the continuous track is driven in the first direction and the combination of the actuator and the biasing member is configured to limit movement of the idler wheel as it pivots toward the drive wheel when the continuous track is driven in the second direction.

In some embodiments, the tensioning system further includes an adjustment member configured to adjust a length of the biasing member. In further embodiments, the tensioning system is coupled to a frame of the carriage assembly by the adjustment member.

In some embodiments, a vehicle includes the carriage assembly according to any of the embodiments described herein. In additional embodiments, a skid-steer loader includes the carriage assembly according to any of the embodiments described herein.

In another representative embodiment, a carriage assembly includes a continuous track extending around a plurality of road wheels, a pivotable idler, and a drive member, and a tensioning system. The tensioning system includes a hydraulic cylinder coupled to the idler, and a spring mounted concentrically over a piston and a push rod of the hydraulic cylinder. The spring is configured to apply force to the idler to maintain tension in the continuous track when the continuous track is driven in a first direction, and the hydraulic cylinder is configured to be activated to apply force to the idler to maintain tension in the continuous track when the continuous track is driven in a second direction, wherein the hydraulic cylinder is configured to be inactive when the continuous track is driven in the first direction.

In some embodiments, the hydraulic cylinder is configured to limit compression of the spring when the continuous track is driven in the second direction. In additional embodiments, the spring extends between a cylinder barrel of the hydraulic cylinder and a midsection of the push rod.

In further embodiments, the tensioning system further includes a first spring retention member coupled to the push rod and a second spring retention member coupled to a cylinder barrel of the hydraulic cylinder such that the spring is coupled to the push rod and the cylinder barrel. In some embodiments, the pivotable idler is coupled to the push rod and the push rod is coupled to the piston, and wherein the spring extends over the push rod and the piston.

In additional embodiments, the carriage assembly further includes a hydraulic motor, and the hydraulic cylinder is configured to receive pressurized hydraulic fluid from the hydraulic motor when the hydraulic motor is operated in the second direction.

In further embodiments, the carriage assembly further includes an adjustment member coupled to the hydraulic cylinder and configured to adjust a length of the spring. In some embodiments, the push rod includes a concave end portion configured to receive an axle of the pivotable idler and a pair of opposing, flat side portions configured to allow the push rod to fit between a pair of idler wheels forming the pivotable idler.

In an additional representative embodiment, a carriage assembly includes a pivotable idler wheel, a pair of fixed idler wheels, a plurality of bogies between the pair of fixed idler wheels, a plurality of road wheels, a drive wheel, a hydraulic motor coupled to the drive wheel, a continuous track extending around the pivotable idler wheel, the pair of fixed idler wheels, the plurality of road wheels and the drive wheel, and a tensioning system positioned between the pivotable idler wheel and the drive wheel. The tensioning system includes a hydraulic cylinder coupled to the pivotable idler wheel, and a spring coupled to a push rod and a cylinder barrel of the hydraulic cylinder such that the spring is concentrically and coaxially aligned with the hydraulic cylinder. The spring is configured to maintain tension in the continuous track when the continuous track is driven in a first direction, and the hydraulic cylinder is configured to receive pressurized hydraulic fluid from the hydraulic motor and assist the spring to maintain tension in the continuous track when the continuous track is driven in a second direction, wherein the hydraulic cylinder is inactive when the continuous track is driven in the first direction.

The foregoing and other objects, features, and advantages of the disclosed technology will become more apparent from the following detailed description, which proceeds with references to the accompanying figures.

DETAILED DESCRIPTION

Described herein are embodiments of carriage assemblies for continuous track drive systems that employ a biasing member to maintain tension in the track when the track is moving in one direction, and an actuator to assist the biasing member to maintain tension in the track when the track is moving in the opposite direction. The biasing member and the actuator form a tensioning system of the disclosed carriage assemblies. In addition to the tensioning system, the disclosed carriage assemblies can also have a pivotable idler wheel, a plurality of road wheels, a drive wheel, and one or more fixed idler wheels for operation of a continuous track drive system.

When driven in a reverse direction, the track tensioning system can experience increased forces due to the geometry of the track system that apply direct, linear force (e.g., pressure) on the biasing member, causing unwanted slack in the continuous track. This additional force can be overcome or compensated for in the embodiments described herein via an actuator, such as a hydraulic cylinder or other actively controllable force-transmitting member or assembly, mounted, for example, parallel to or aligned with the biasing member. The actuator can apply force counter to the force applied to the biasing member by the continuous track to assist with maintaining a specified level/degree of tension on the continuous track. The actuator, for instance, can be in fluid communication with a reverse-direction flow circuit of a hydraulic motor of the vehicle and/or of the carriage assembly to receive pressurized hydraulic fluid, thereby assisting the biasing member with maintaining tension in the continuous track.

The disclosed technology can be applicable to any vehicle having a continuous track propulsion system, including utility vehicles such as walk-behind vehicles or riding vehicles (e.g., trenchers, chippers, mulchers, shredders, lawn mowers, snowmobiles, etc.), construction vehicles (e.g., bulldozers, excavators, skid-steer loaders, etc.), military vehicles, or the like. Although the disclosed technology may also be applied in analogous manner to vehicles with other types of multi-wheel traction systems, the proceeding description is with reference to an exemplary tracked land vehicle as a non-limiting example in order to conveniently illustrate the details of the disclosed technology.

Figure 1:
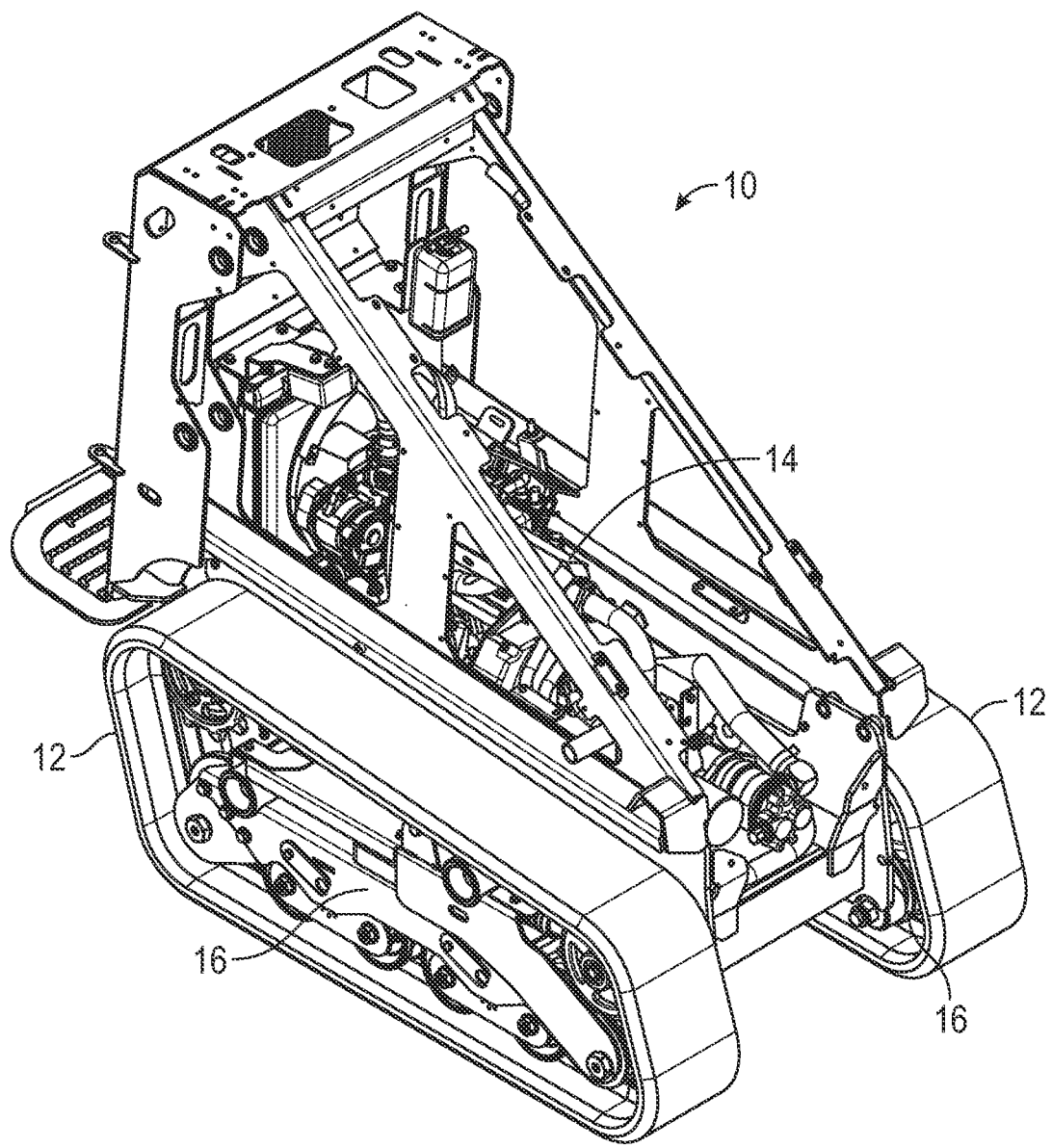
FIG. 1 is a perspective view of a utility vehicle having two continuous track carriage assemblies of the present disclosure.

FIG. 1 illustrates an exemplary utility vehicle 10 configured as a skid-steer loader employing a pair of continuous track systems 12 for support and propulsion. Such utility vehicles can include an engine 14 and can have, for example, a pair of loading or lift arms designed to utilize multiple types of industry-standardized attachments, such as for use in the construction and landscaping industries. Each continuous track system 12 comprises a respective track carriage assembly 16 as described herein that is configured to be mounted to the body of the vehicle 10. For ease of discussion, the following description relates to a single carriage assembly 16. It is understood that the arrangement, orientation, and/or configuration of the carriage assembly 16 described herein can be adapted for various applications.

Figure 2:
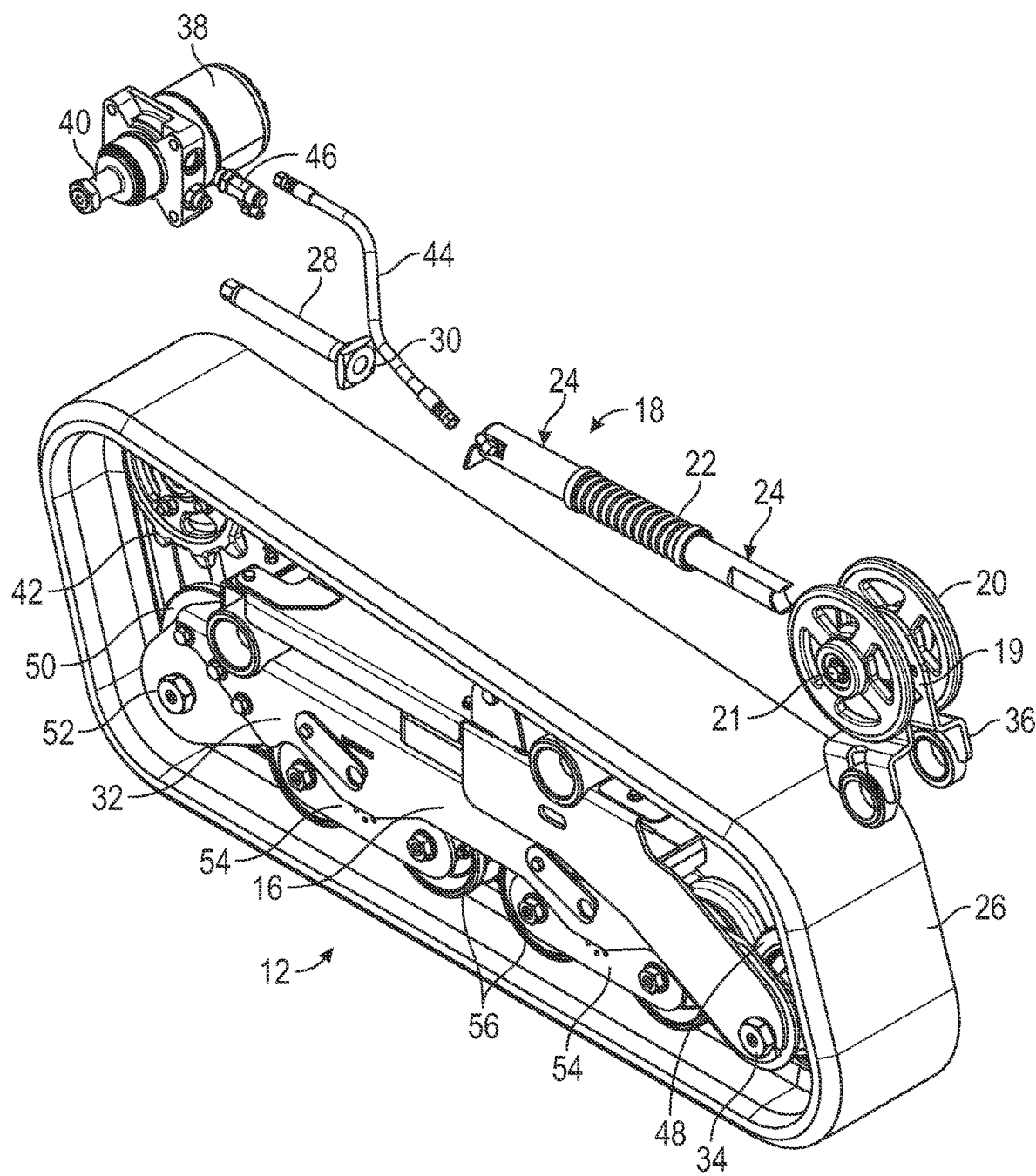
FIG. 2 is a perspective view of one of the track carriage assemblies of FIG. 1 and a tensioning assembly of the carriage assembly according to one embodiment, in an exploded state.
Figure 3:
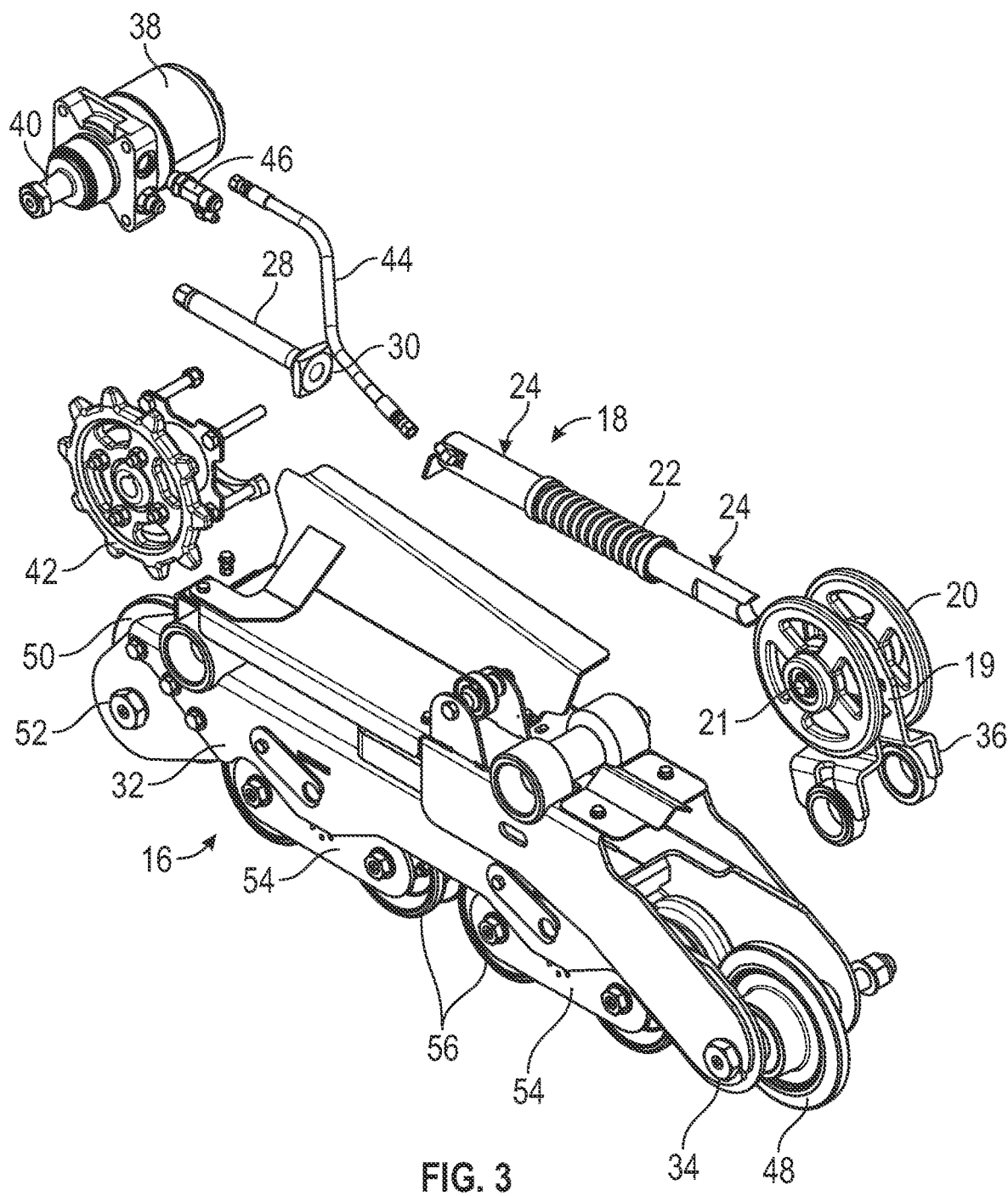
FIG. 3 is a perspective view of the track carriage assembly of FIG. 2 with the continuous track removed for purposes of illustration.

FIGS. 2 and 3 illustrate a single continuous track system 12 and an exemplary carriage assembly 16 thereof. For ease of illustration and discussion, a tensioning system 18, an idler wheel assembly 19, and other components of the carriage assembly 16 are shown removed and displayed in an exploded state in both FIGS. 2 and 3, while the continuous track is removed in FIG. 3. FIGS. 2-3 show the individual relationships of the components and of the tensioning system 18 as a whole. Generally, the end of the carriage assembly where the idler wheel assembly 19 is positioned is the "front" of the carriage assembly, and forward motion of the vehicle is generally toward the lower right corner of FIGS. 2 and 3. Accordingly, reverse motion of the vehicle is generally in a direction toward the left edge of the figures herein. Nevertheless, either end of the vehicle/carriage can be considered the "front," and the vehicle can be operable in both forward and reverse directions.

Figure 4A:
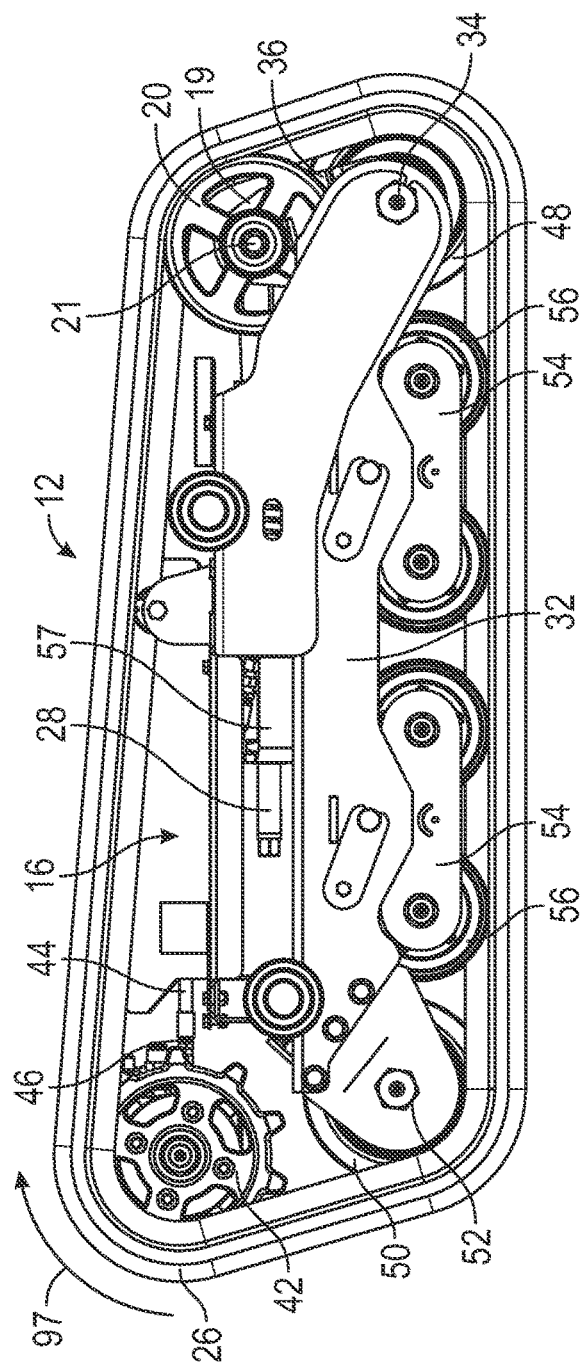
FIG. 4A is a side view of the track carriage assembly and the tensioning system of FIGS. 2 and 3 in an assembled state.
Figure 4B:
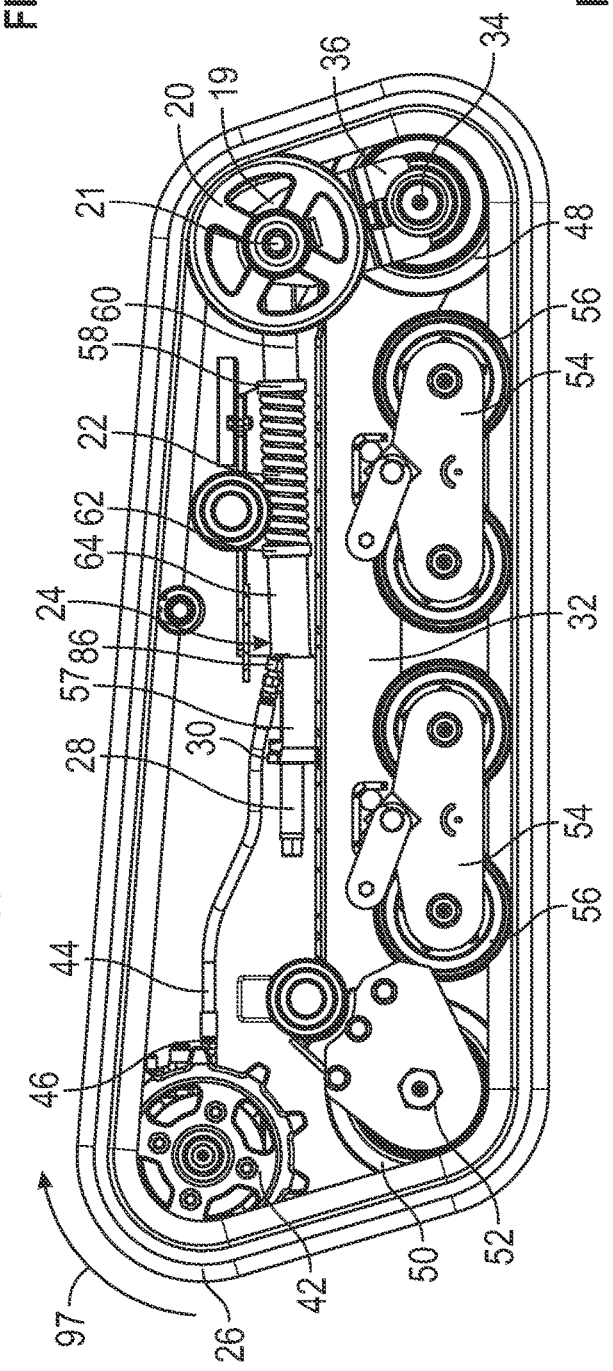
FIG. 4B is a side view of the track carriage assembly and the tensioning system of FIGS. 2 and 3 in an assembled state with a frame portion removed for purpose of illustration.

As shown in FIG. 2, the tensioning system 18 of the carriage assembly 16 includes a biasing member configured as a coil spring 22, and an actuator configured as a hydraulic cylinder 24. The tensioning system 18 can be coupled to a carriage frame 32 via an adjustment member 28 and lock nut 30 (FIGS. 4A and 4B). As will be described in more detail, the spring 22 can be used to maintain tension in a continuous track 26 when the track system 12 moves in a first direction (e.g., forward), while the actuator 24 can be operated to assist the spring 22 to maintain tension in a continuous track 26 when the track system 12 moves in a second direction (e.g., reverse). Although the biasing member 18 and the actuator 24 in the illustrated embodiment are described a coil spring and hydraulic cylinder, respectively, it is understood that other mechanical, electromechanical, and/or pneumatic devices configured to apply force between objects or surfaces can be used according to the principles described herein.

As shown in the illustrated examples of FIGS. 2 and 3, the carriage assembly 16 further includes the continuous track 26, the carriage frame 32, and the idler wheel assembly 19. In the illustrated example, the idler wheel assembly 19 includes a pair of idler wheels 20, an idler assembly axle 21, and a pivot mount 36 which can be mounted to a forward idler axle 34 of the frame (e.g., FIG. 5) such that the idler wheel assembly 19 is pivotable relative to the carriage frame 32. By being configured to pivot, the idler wheel assembly 19 allows forward and rearward, radial motion of the idler wheels 20 such that the idler wheels 20 can contact the continuous track 26. In this way, the idlers wheels 20 can apply pressure to the continuous track 26 to maintain tension via the force applied by the spring 22 and/or the hydraulic cylinder 24 of the tensioning system 18 (e.g., see FIGS. 6-8 and 9). As shown in FIGS. 2 and 3, the pivotable idler wheels 20 can be axially spaced apart from one another along the axle 21 such that the pair of wheels engage the outer edge portions of the continuous track for greater tension, traction, or the like (e.g., as shown in FIGS. 4A-4B). In some embodiments, the idler wheel assembly 19 can comprise one idler wheel, or three or more idler wheels.

The carriage assembly 16 also includes a track drive motor or hydraulic motor 38 having a drive shaft 40 coupled to a drive sprocket or drive wheel 42. The hydraulic motor 38 can be configured to propel the continuous track 26 around the carriage and move the track system 12 in a first, forward direction (e.g., to the right in FIG. 4A) and a second, reverse direction (e.g., to the left in FIG. 4A). The hydraulic motor 38 can be further configured to deliver pressurized hydraulic fluid to the cylinder 24 via a conduit or hose 44 coupled to the cylinder 24 when the hydraulic motor 38 is operated or active in the reverse direction. For instance, when the track system 12 is driven in the reverse direction, the hydraulic cylinder 24 is configured to receive hydraulic fluid via the hose 44 coupled to the reverse circuit fitting 46 of the hydraulic motor 38. Force applied by the pressurized hydraulic fluid to the hydraulic cylinder 24 can be transmitted to the idler wheel assembly 19 via the front end of the cylinder 24 to assist the spring 22 with maintaining tension in the track 26. Although described as a hydraulic motor coupled to a hydraulic cylinder, the track drive motor 38 can also be an electric motor, an internal combustion engine, or any other source of motive power or prime mover, which can be connected to one or more hydraulic pumps to supply hydraulic fluid to the tensioning systems described herein. In further examples, the motor 38 can be coupled to the body of the utility vehicle 10 directly and/or the carriage frame 32 and can be either in a fixed position or provided suspension.

Referring to FIGS. 2-4B, the carriage assembly 16 can also include a plurality of additional idler wheels to guide the track 26 around the carriage and/or further tension the continuous track 26, and a plurality of road wheels along its bottom length. For example, and as best illustrated in FIG. 3, a pair of idler wheels 48, 50 are mounted at the front and rear of the carriage assembly 16. In particular, a first idler wheel 48 of the pair of idler wheels is mounted to the forward idler axle 34, while a second idler wheel 50 is mounted to the rearward idler axle 52. In addition, one or more sub-assemblies or bogies 54 including a plurality of road wheels 56 are coupled to the bottom portion of the frame 32 and located between the pair of idler wheels 48, 50. In certain embodiments, the bogies 54 can be configured to support the weight of the vehicle and to move vertically relative to the carriage frame 32 and/or the vehicle 10 such that the continuous track 26 engages and is able to traverse the terrain navigated by the continuous track system 12.

Any combination of the idler wheels, road wheels, and bogies can be fixed and/or can be provided with suspension for traversing terrain. For instance, the idler wheels 48, 50 illustrated in FIGS. 2 and 3 are fixed at their respective idler axles 34, 52, while each bogie 54 is configured to move with some degree of upward and/or downward vertical displacement. In other embodiments, one or more idlers may be movable, and one or more bogies may be fixed relative to the carriage frame and/or the utility vehicle depending upon the particular requirements of the system. Though the numbers of idler wheels, bogies, and road wheels are described here with specificity, any number of idler wheels, road wheels, and bogies may be included in the carriage assembly 16, which can also include any number of return rollers, such as between the drive wheel 42 and the pivotable idler wheel 20.

FIGS. 4A-4B illustrate the continuous track system 12 and carriage assembly 16 in an assembled state. FIG. 4A illustrates the locations and spatial relationships of the continuous track 26, carriage frame 32, tensioning system 18, idler wheel assembly 19, idler wheels 20, and drive wheel 42 as well as the pair of idler wheels 48, 50 and bogies 54. In a similar fashion, FIG. 4B illustrates the track carriage assembly 16 in an assembled state with certain carriage frame 32 components removed to expose the tensioning system 18. FIG. 4B shows the locations and spatial relationships of the spring 22, push rod 60, cylinder barrel 64, hose 44, and cylinder fitting 86 as further described herein.

As shown in FIGS. 4A-4B, the continuous track 26 is situated around the pivotable idler wheels 20, the front idler wheel 48, the road wheels 56, the rear idler wheel 50, and the drive wheel 42 such that rotational motion of the drive shaft 40 of the hydraulic motor 38 causes rotation of the drive wheel 42 and continuous track 26. In some examples, the continuous track 26 can be made of soft material, such as a synthetic rubber, or a rigid material such as reinforced steel wires and/or plates, and/or a combination of soft and rigid materials. The continuous track can also have a chain link or belt configuration with a plurality of links or pegs such that the teeth of the drive wheel 42 engage with the holes or spaces therebetween such that the track is propelled.

Figure 5:
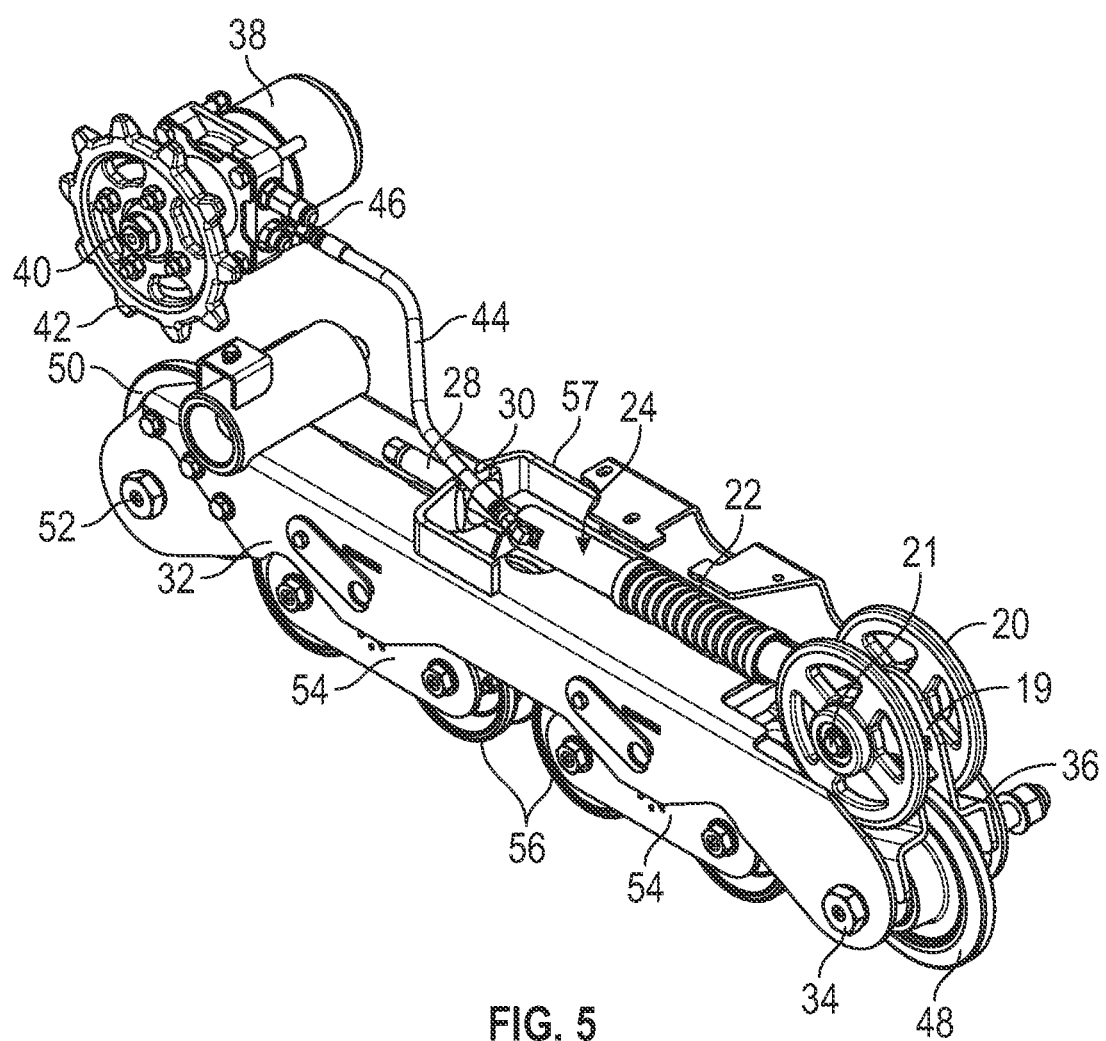
FIG. 5 is a perspective view of the track carriage assembly and the tensioning system of FIGS. 2-3 in an assembled state with the continuous track and portions of the frame removed for the purpose of illustration.

Referring to FIG. 5, the illustrated example shows the carriage assembly 16 and tensioning system 18 in an assembled state with the continuous track 26 and one or more frame members removed for the purpose of illustration. The illustrated example shows that the tensioning system 18 can have a coaxial and concentric configuration and is coupled to an upper portion of the carriage frame 32 via the adjustment member 28 and lock nut 30. For instance, FIG. 5 shows that the spring 22 is concentrically and axially aligned with, and extends partially over, the hydraulic cylinder 24. The hydraulic cylinder 24 can be coupled to the adjustment member 28 and extends in a longitudinal direction from the adjustment member 28 to the idler wheel assembly 19. The rear of the hydraulic cylinder 24 (e.g., the cylinder barrel 64) is coupled to the adjustment member 28, and the hydraulic motor 38 via the hose 44. By way of the coupling of the hydraulic motor 38 and hose 44 to the hydraulic cylinder 24, the hydraulic cylinder 24 is configured to receive hydraulic fluid from the hydraulic motor 38 when the motor is operated in a reverse direction.

The adjustment member 28 and lock nut 30 can be configured to adjust the tension force applied to the pivotable idler wheel 20 by the spring 22. For example, the lock nut 30 can be coupled to a bracket 57 of the carriage frame 32 such that the adjustment member 28 and rear of the hydraulic cylinder 24 can be moved forward or rearward relative to the lock nut 30. The forward or rearward positioning of the hydraulic cylinder 24 decreases or increases, respectively, the length of the spring 22 (e.g., the length of the spring between the first and second spring retention members 58, 62 in FIGS. 6-9). As such, the tension in the continuous track 26 can be adjusted via the adjustment member 28 as the length of the spring 22 and corresponding position of the idler wheel assembly 19 are adjusted. In the illustrated embodiment, the adjustment member 28 is an adjustment rod. However, the adjustment member 28 can be configured in a variety of ways to adjust the axial (e.g., forward and rearward) position of the hydraulic cylinder 24 relative to the frame 32, including as a cable, track, and/or roller system. In this way, the tension in the track 26 can be maintained by the pressure/force applied to the track 26 by the pivotable idler wheels 20 and the spring 22 when the continuous track system 12 (and vehicle 10) is stationary or moved in a forward direction. In a similar manner, the pivotable idler wheels 20 and spring 22 can partially maintain tension in the track 26 when the track 26 moves in the reverse direction, and can be assisted by the hydraulic cylinder 24 to fully compensate for or overcome the additional forces applied by the track in such case.

Figure 6:
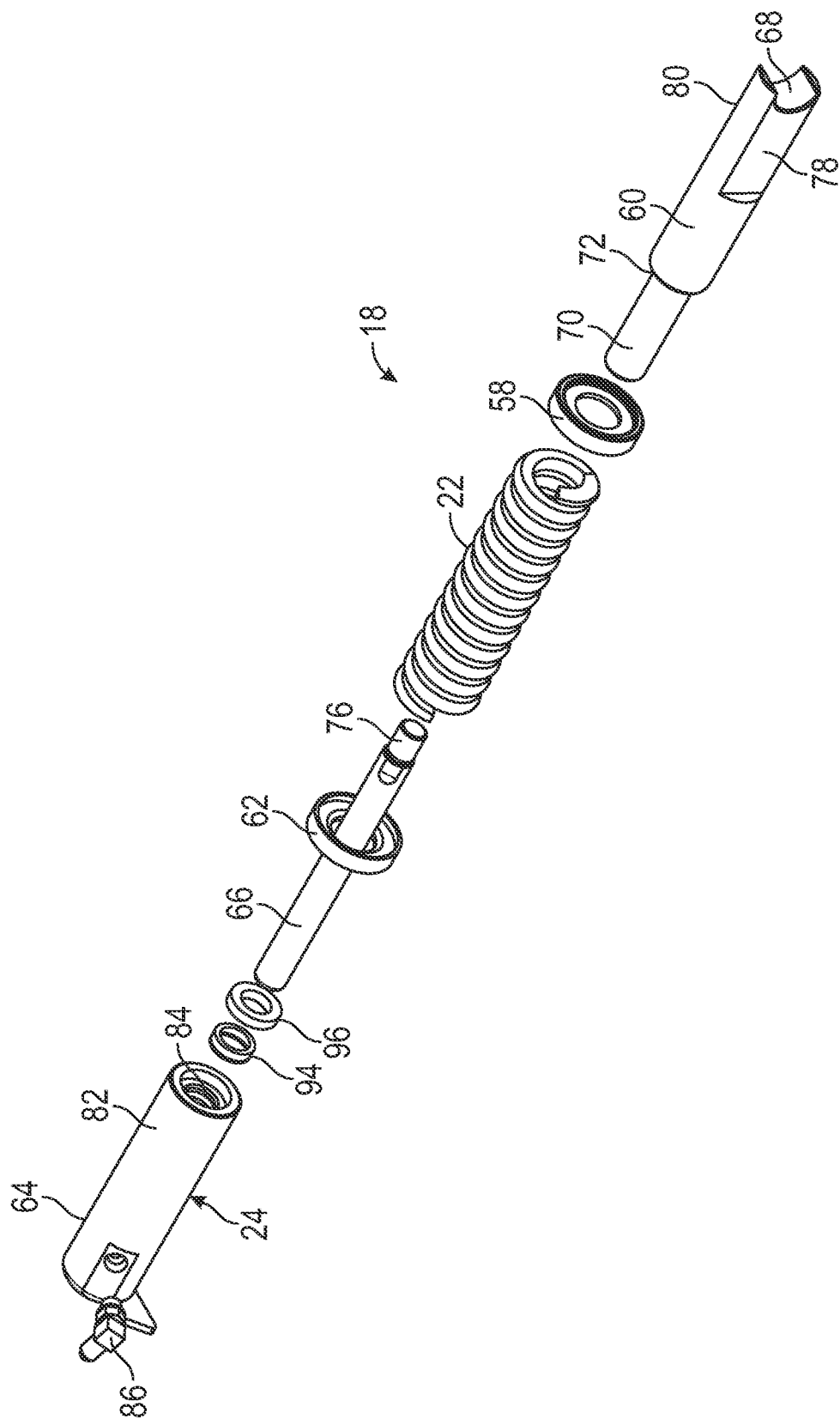
FIG. 6 is perspective view of the tensioning system of FIGS. 2-5 in an exploded state.
Figure 7:
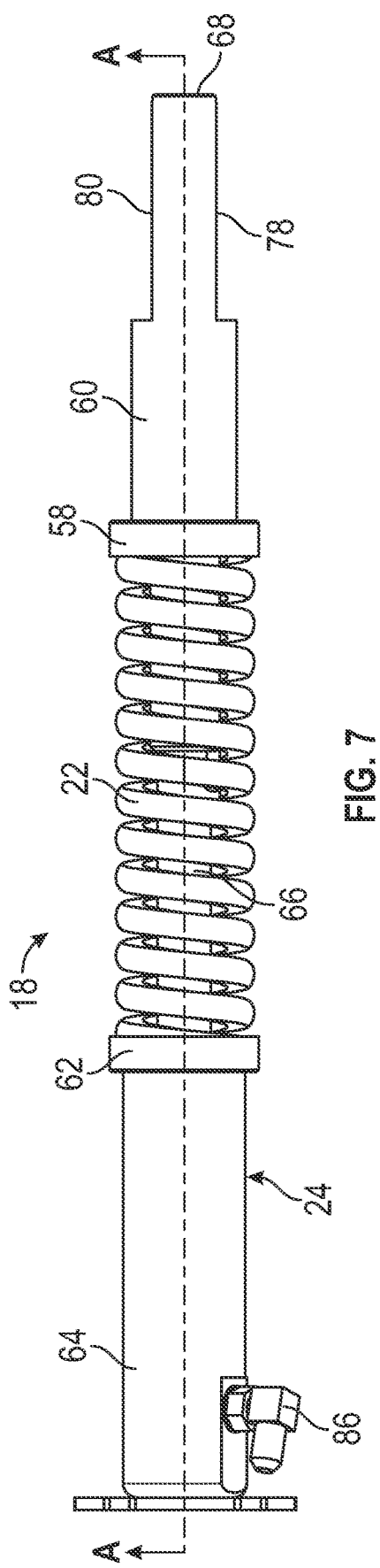
FIG. 7 is a side view of the tensioning system of FIG. 6.
Figure 8:
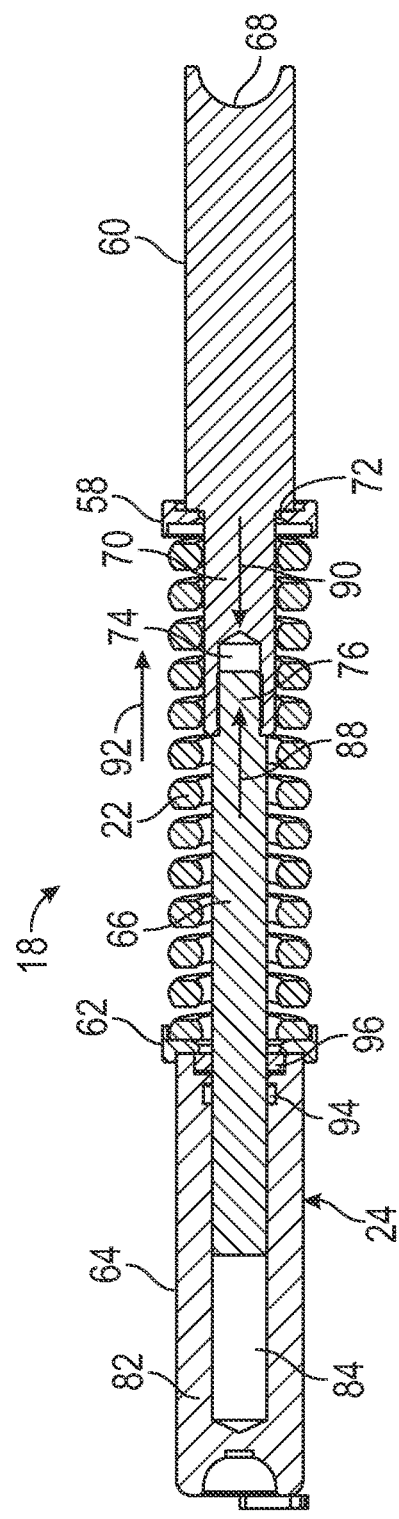
FIG. 8 is a cross-sectional side view of the tensioning system of FIGS. 6-7 taken along a longitudinal axis A of FIG. 7.

FIGS. 6-8 illustrate the tensioning system 18, according to one embodiment, in greater detail. For instance, in the illustrated embodiment the spring 22 extends between a first spring retention member 58 and a second spring retention member 62 coupled to a push rod 60 and a cylinder barrel 64 of the hydraulic cylinder 24, respectively. The spring 22 can extend between the first and second spring retention members 58, 62. The force applied by the spring 22 to the push rod 60, which is coupled to the idler wheel assembly 19, is transmitted to the idler wheel assembly 19 such that the idler wheels 20 contact and tension the continuous track 26. As such and as indicated herein, the forward and rearward positioning of the hydraulic cylinder 24 (e.g., the cylinder barrel 64) relative to the carriage frame 32 increases or decreases, respectively, the force applied to the idler wheel assembly 19 and the push rod 60 by the spring 22. Stated differently, the force applied to the idler wheel assembly by the spring 22 via the push rod 60 can be adjusted by lengthening or shortening the spring 22 to maintain tension in the continuous track 26 and avoid slack or slippage of the track as the track moves in the first direction, for example, as the track moves from the drive wheel 42 to the pivotable idler wheels 20 (e.g., in the direction indicated by arrow 97 in FIGS. 4A-4B). As before mentioned, however, in certain embodiments, although the tension in the track 26 maintained by the spring 22 can be sufficient to avoid slack in the track when the track is moving in the first direction, the geometry of the track system 12 and the pull of the track 26 on the idler wheel 20 when the track is moving in the reverse direction can overcome the force provided by the spring and can lead to unwanted slack or slippage of the track.

Referring again to FIGS. 6-8, the hydraulic cylinder 24 can be configured to provide counter force/pressure to the idler wheel assembly 19 and push rod 60 when the track 26 is being moved in a reverse direction such that the hydraulic cylinder 24 works in combination with the spring 22 to compensate for the additional forces created by the track 26 in order to maintain track tension. In certain embodiments, the hydraulic cylinder 24 can therefore be configured to be in an inactive state when the track 26 is moving in a forward direction, and in an active or operable state when the track 26 is moving in a reverse direction.

As shown in the illustrated examples of FIGS. 6-8, the actuator or hydraulic cylinder 24 includes a piston 66 as well as the push rod 60, cylinder barrel 64, and the pair of spring retention members 58, 62 coupled to the push rod 60 and barrel 64. In the illustrated embodiment, the push rod 60 is configured to transmit the force of the spring 22, the piston 66, and/or their combined forces to the pivotable idler wheel assembly 19. In particular, the push rod 60 includes an incurved or concave end portion 68 (FIG. 7) configured to receive and couple to the axle 21 of the idler wheel assembly such that the push rod 60 can direct the forward, radial motion (e.g., pivot) of the idler wheels 20 when a force is applied to the push rod 60 such that the idler wheels 20 contact and tension the track 26. The push rod 60 also has a narrow or reduced diameter portion 70 that spans the length between a shoulder or midsection 72 of the push rod 60 and the end of the push rod 60 closest to the piston 66. The narrow portion 70 of the push rod 60 is configured to extend inside the spring 22 and couple to the first spring retention member 58 and to the piston 66. For example, the narrow portion 70 is sized and shaped to extend through the opening of the first spring retention member 58 and into the spring 22, and includes a bore or cavity 74 sized and shaped to a receive an end portion or crown 76 of the piston 66 (see FIG. 7). While the narrow portion 70 is configured to extend through the opening of the first spring retention member 58, the midsection 72 of the push rod 60 has an outer diameter greater than the opening of the spring retention member 58. The greater diameter of the midsection 72 prevents the first spring retention member 58 from moving beyond the midsection 72 and couples the spring retention member 58 and the push rod 60 such that the force exerted by the spring 22 on the first spring retention member 58 translates the push rod 60 toward the idler, and vice versa. In addition, the push rod 60 includes a pair of opposing, flat side portions 78, 80 that can, for example, allow the push rod 60 to fit between the pair of idler wheels 20.

Still referring to FIGS. 6-8, the cylinder barrel 64 of the hydraulic cylinder 24 includes a body 82 and an inner chamber 84 configured to receive the shaft of the piston 66 and hydraulic fluid supplied by the hydraulic motor 38 via the hose 44 and cylinder fitting 86 when the motor is operated (i.e., active) in the reverse direction. A pressure seal 94 and dust seal 96 can be included in addition to the piston 66 as to form a gland to enclose and keep debris out of the chamber 84 during operation.

As shown in FIGS. 6-8, the hydraulic cylinder 24 can also be configured to be concentrically and coaxially aligned with the spring 22 in such a way that the spring 22 extends partially over the cylinder (e.g., partially over the push rod 60 and piston 66). Despite the tensioning system 18 being described as having a coaxial and concentric configuration, the spring and hydraulic cylinder may be arranged or positioned in parallel with one another in accordance with the principles and description herein.

Figure 9:
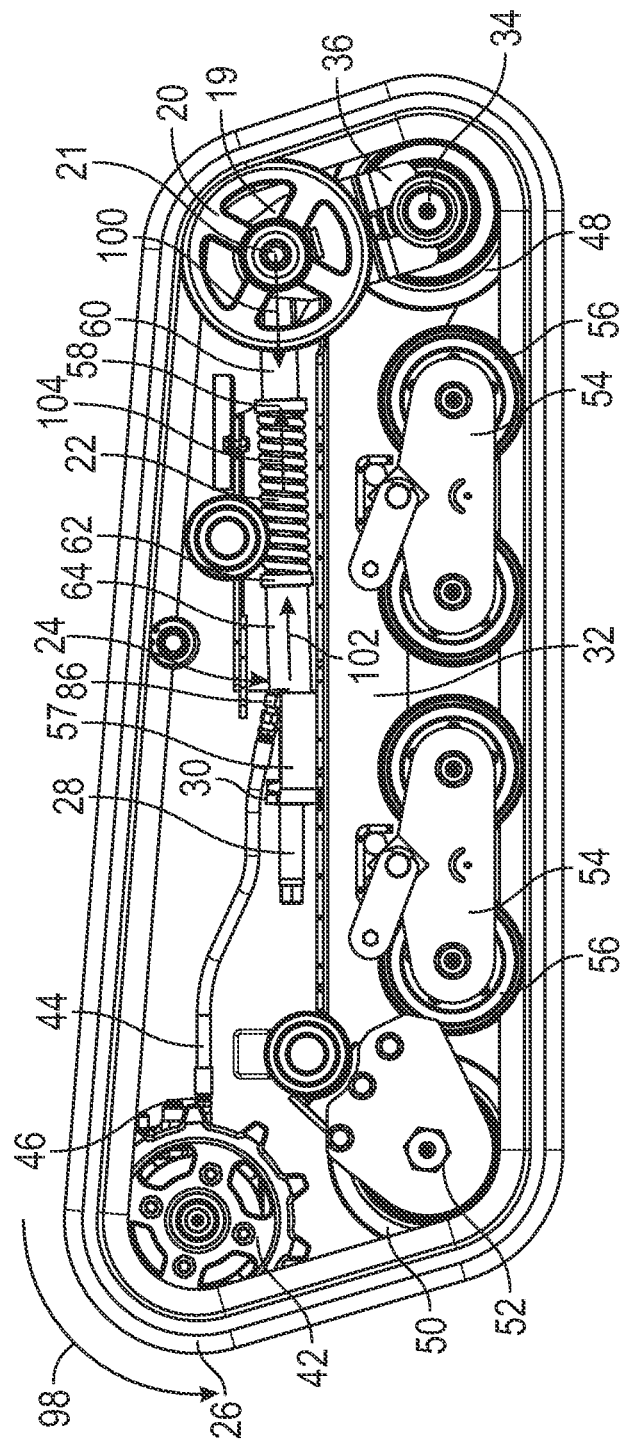
FIG. 9 is a side view of the track carriage assembly and tensioning system of FIG. 4B showing movement of a continuous track of the track assembly and the forces acting on the tensioning system.

FIGS. 8-9 illustrate the operation of the tensioning system 18 in the continuous track system 12 and carriage assembly 16. As described herein, during forward motion of the vehicle, the spring 22 can apply a force to the idler wheel assembly 19 in the direction of vehicle motion to maintain tension in the continuous track 26. As noted above, this tension can be adjustable via the adjustment member 28. In certain embodiments, during forward motion of the vehicle the hydraulic cylinder 24 is in an inactive state, meaning the hydraulic cylinder 24 provides little to no assistance to the spring 22. However, in certain embodiments motion of the vehicle and the continuous track 26 in the reverse direction, e.g., the track moving in a counterclockwise direction in FIG. 9 as indicated by arrow 98, can cause the push rod 60 to translate and the pivotable idler wheel 20 to pivot, in the direction of reverse motion of the vehicle. Arrow 100 of FIG. 9 indicates this directional force applied to the idler wheel assembly 19 and push rod 60 by the continuous track 26. The force from the continuous track 26 acting on the idler wheel assembly 19 and the push rod 60 can compress the spring 22, resulting in slackening of the continuous track 26.

In certain embodiments, when the vehicle is operated in reverse, the hydraulic system can be configured to provide pressurized hydraulic fluid from the motor 38 to the cylinder 24 by way of, for example, the reverse-direction hydraulic circuit of the motor. In certain embodiments, pressurized hydraulic fluid can be provided to the cylinder 24 automatically from the reverse circuit fitting 46 when the vehicle is placed in a reverse direction/operation mode by the operator. The hydraulic cylinder actuator is thus automatically activated to apply force to the continuous track when the vehicle is operated in reverse. In particular, during reverse motion the pressurized hydraulic fluid supplied to the cylinder barrel 64 and piston 66 of the hydraulic cylinder 24, which is coupled to the reverse circuit fitting 46 of the hydraulic motor 38, applies a counter force to the idler wheels 20, the push rod 60, the spring 22, and/or components coupled thereto, in a direction opposite the direction of motion (e.g., in the direction of forward motion of the vehicle) as indicated by arrows 102 and 104.

As best illustrated in FIG. 8, as the hydraulic fluid is received in the chamber 84 of the hydraulic cylinder barrel 64, the piston 66 which is coupled to the push rod 60 moves through the second spring retention member 62 and into the spring 22 to apply force to the push rod 60 as indicated by arrow 88, and thereby to the idler wheel assembly 19. The force applied by the piston 66 can act counter to the force (arrow 90) applied on the push rod 60 and idler wheels 20 by the track moving in the reverse direction. As a result and as indicated by arrow 92, the spring 22 also exerts a force on the push rod 60 and thereby the pivotable idler wheel assembly 19 to help maintain tension in the continuous track 26 when the hydraulic cylinder 24 is active. When the vehicle is returned to the forward direction/operation mode, the reverse direction hydraulic circuit can be depressurized (e.g., as pressurized hydraulic fluid is directed to the forward direction circuit), and the hydraulic cylinder actuator can return to an inactive state in which the piston moves passively with motion of the idler wheel assembly.

This counter force limits or reduces the degree of compression in the spring 22 and maintains a selected angular position of the pivotable idler wheel 20 relative to the carriage assembly 16, thereby reducing or eliminating slackening of the track. In other words, by controlling the pressure of the hydraulic fluid and/or the position of the piston 66 (FIGS. 6-8), the relative position (e.g., angular position) of the pivotable idler wheel 20, and thereby the degree of tension in the continuous track 26, can be controlled as the vehicle moves in reverse. In some implementations, the position of the piston 66 and/or the pressure of the hydraulic fluid supplied to the hydraulic cylinder 24 can be varied according to the speed of the vehicle as it moves in reverse.

Figure 10A:
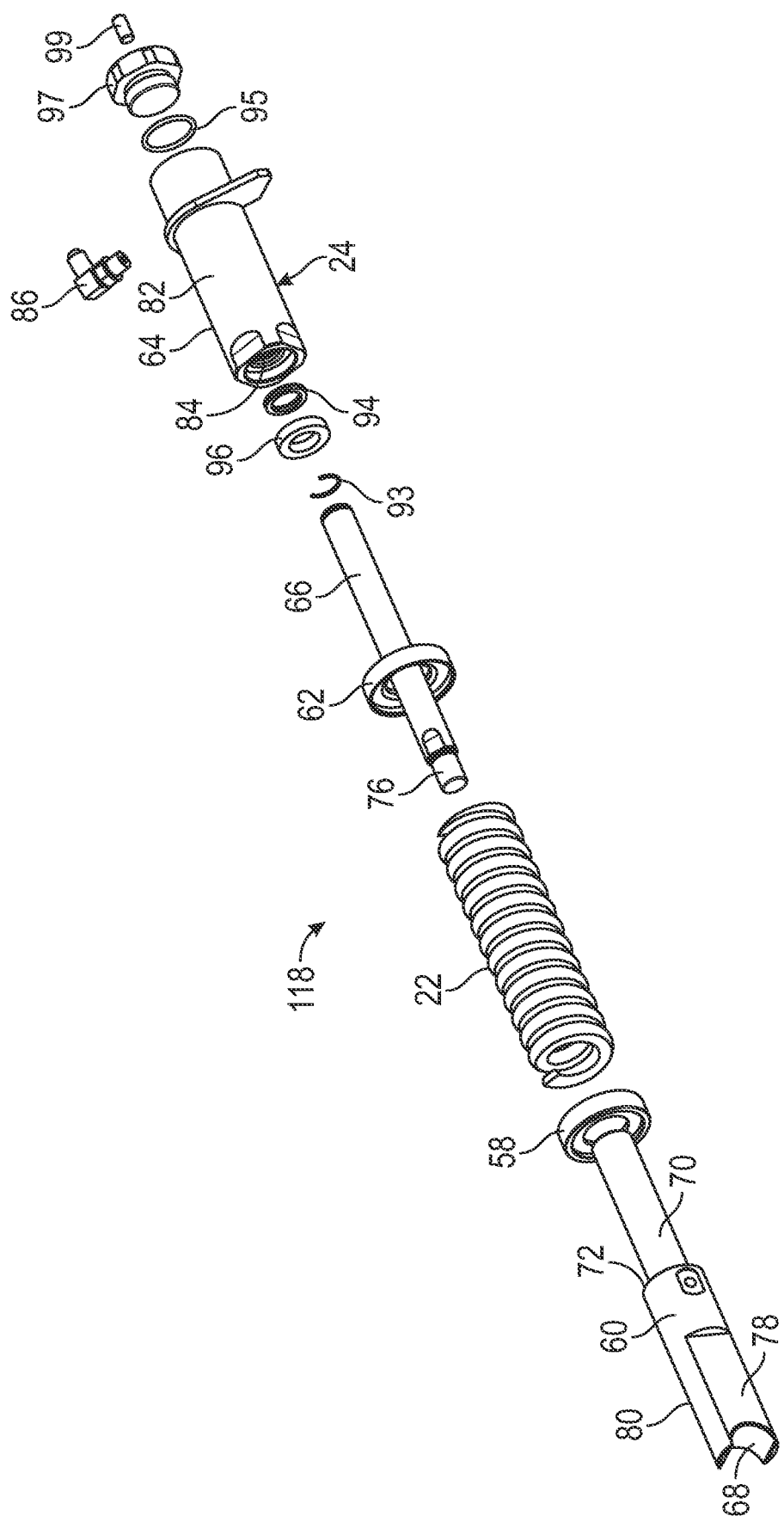
FIG. 10A is a perspective view of a tensioning system according to another embodiment, in an exploded state.
Figure 10B:
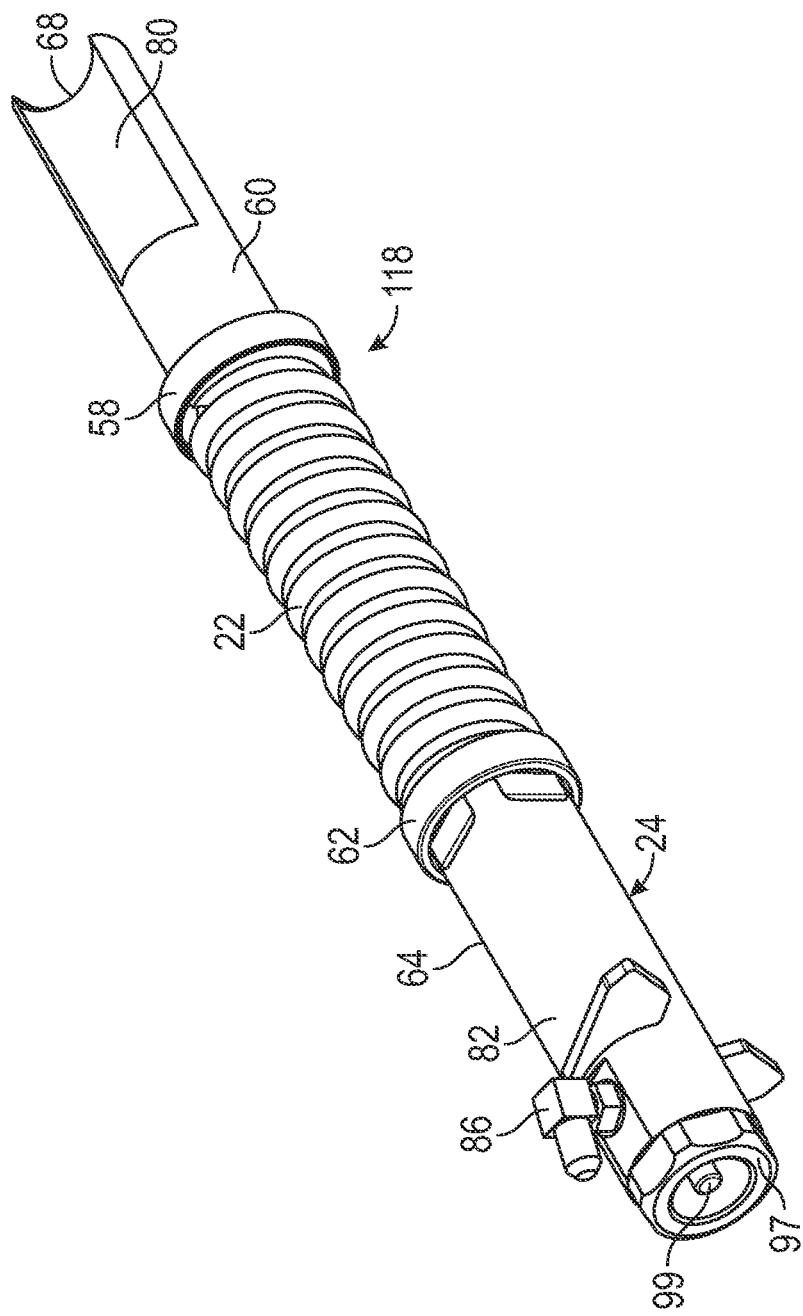
FIG. 10B is a perspective view of the tensioning system of FIG. 10A in an assembled state.

FIGS. 10A-10B illustrate an exemplary tensioning system 118 according to another embodiment. The tensioning system 118 can be structurally similar to and function in the same manner as the tensioning system 18, as described herein. For instance, the tensioning system 118 can include all and/or any combination of the components of the tensioning system 18, including the spring 22, spring retention members 58, 62, and the hydraulic cylinder 24 and associated components. The tensioning system 118 can further include components that can limit or prevent the piston 66 from separating from the cylinder barrel 64 and to enclose the chamber 84 of the cylinder barrel 64. As shown in FIG. 10A, the tensioning system 118 can include a retaining member configured as a snap ring 93 in addition to the pressure seal 94 and dust seal/wiper member 96. The snap ring 93 can be configured as a mechanical stop to limit the travel of and retain the piston 66 within the cylinder barrel 64, for example, in the event of breakage in the continuous track 26 or disengagement between the track 26 and the carriage assembly 16.

As illustrated in FIGS. 10A-10B, the tensioning system 118 can also include an end cap 97, a dowel 99, and a gasket or O-ring 95. The combination of the end cap 97 and O-ring 95 is configured to enclose the chamber 84 of the cylinder barrel 64. In certain embodiments, the end cap 97 can include a first set of threads configured for threaded engagement with a corresponding second set of threads of the cylinder barrel 64. In other embodiments, the end cap 97 can be coupled to the carriage frame 32, bracket 57, the adjustment member 28, lock nut 30, or a combination thereof.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

Although there are alternatives for various components, parameters, operating conditions, etc., set forth herein, that does not mean that those alternatives are necessarily equivalent and/or perform equally well. Nor does it mean that the alternatives are listed in a preferred order unless stated otherwise.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims. We therefore claim all that comes within the scope and spirit of these claims.

The invention claimed is:

1. A carriage assembly comprising:
a plurality of road wheels;
a fixed idler wheel;
a pivotable idler wheel wherein the pivotable idler wheel is pivotably coupled to an axle of the fixed idler wheel;
a drive wheel;
a continuous track extending around the plurality of road wheels, the pivotable idler wheel, and the drive wheel; and
a tensioning system coupled to the pivotable idler wheel, the tensioning system comprising an actuator and a biasing member, wherein the tensioning system is configured such that when the continuous track is driven in a first direction the actuator is inactive and the biasing member maintains tension in the continuous track, and when the continuous track is driven in a second direction the actuator is active and applies force to the pivotable idler wheel to maintain tension in the continuous track.

2. The carriage assembly of claim 1, wherein the biasing member is coupled to the actuator.

3. The carriage assembly of claim 1, wherein the actuator is coupled to the idler wheel.

4. The carriage assembly of claim 1, wherein the actuator and the biasing member are coaxially aligned.

5. The carriage assembly of claim 1, wherein the biasing member is positioned over the actuator such that the biasing member and the actuator are concentrically aligned.

6. The carriage assembly of claim 1, wherein the biasing member is configured to limit movement of the idler wheel as the idler wheel pivots toward the drive wheel when the continuous track is driven in the first direction and the combination of the actuator and the biasing member is configured to limit movement of the idler wheel as it pivots toward the drive wheel when the continuous track is driven in the second direction.

7. The carriage assembly of claim 1, the tensioning system further comprising an adjustment member configured to adjust a length of the biasing member.

8. The carriage assembly of claim 7, wherein the tensioning system is coupled to a frame of the carriage assembly by the adjustment member.

9. A vehicle comprising the carriage assembly of claim 1.

10. A skid-steer loader comprising the carriage assembly of claim 1.

11. A carriage assembly comprising:
a continuous track extending around a plurality of road wheels, a fixed idler, a pivotable idler, and a drive member; and
a tensioning system comprising a hydraulic cylinder coupled to the idler, and a spring mounted concentrically over a piston and a push rod of the hydraulic cylinder, wherein the pivotable idler is pivotably coupled to an axle of the fixed idler, wherein the spring is configured to apply force to the pivotable idler to maintain tension in the continuous track when the continuous track is driven in a first direction, and the hydraulic cylinder is configured to be activated to apply force to the pivotable idler to maintain tension in the continuous track when the continuous track is driven in a second direction, wherein the hydraulic cylinder is configured to be inactive when the continuous track is driven in the first direction.

12. The carriage assembly of claim 11, wherein the hydraulic cylinder is configured to limit compression of the spring when the continuous track is driven in the second direction.

13. The carriage assembly of claim 11, wherein the spring extends between a cylinder barrel of the hydraulic cylinder and a midsection of the push rod.

14. The carriage assembly of claim 11, the tensioning system further comprising a first spring retention member coupled to the push rod and a second spring retention member coupled to a cylinder barrel of the hydraulic cylinder such that the spring is coupled to the push rod and the cylinder barrel.

15. The carriage assembly of claim 11, wherein the pivotable idler is coupled to the push rod and the push rod is coupled to the piston, and wherein the spring extends over the push rod and the piston.

16. The carriage assembly of claim 11, wherein:
the carriage assembly further comprises a hydraulic motor; and
the hydraulic cylinder is configured to receive pressurized hydraulic fluid from the hydraulic motor when the hydraulic motor is operated in the second direction.

17. The carriage assembly of claim 11, further comprising an adjustment member coupled to the hydraulic cylinder and configured to adjust a length of the spring.

18. The carriage assembly of claim 11, the push rod comprising a concave end portion configured to receive an axle of the pivotable idler and a pair of opposing, planar side portions configured to allow the push rod to fit between a pair of idler wheels forming the pivotable idler.

19. A carriage assembly comprising:
a pivotable idler wheel;
a pair of fixed idler wheels comprising a first fixed idler wheel and a second fixed idler wheel;
a plurality of bogies between the pair of fixed idler wheels, the plurality of bogies comprising a plurality of road wheels;
a drive wheel;
a hydraulic motor coupled to the drive wheel;
a continuous track extending around the pivotable idler wheel, the pair of fixed idler wheels, the plurality of road wheels and the drive wheel; and
a tensioning system positioned between the pivotable idler wheel and the drive wheel, the tensioning system comprising a hydraulic cylinder coupled to the pivotable idler wheel, and a spring coupled to a push rod and a cylinder barrel of the hydraulic cylinder such that the spring is concentrically and coaxially aligned with the hydraulic cylinder,
wherein the pivotable idler wheel is pivotably coupled to an axle of the first fixed idler wheel,
wherein the spring is configured to maintain tension in the continuous track when the continuous track is driven in a first direction, and the hydraulic cylinder is configured to receive pressurized hydraulic fluid from the hydraulic motor and assist the spring to maintain tension in the continuous track when the continuous track is driven in a second direction, wherein the hydraulic cylinder is inactive when the continuous track is driven in the first direction.

* * * * *